United States Patent [19]

Koguchi et al.

[11] Patent Number: 5,089,892
[45] Date of Patent: Feb. 18, 1992

[54] GHOST CANCELLER EMPLOYING PLURAL REFERENCE SIGNALS

[75] Inventors: Tatsushi Koguchi, Iwai; Shigehiro Ito; Kazuyuki Ebihara, both of Toride; Yuji Nishi, Iwai, all of Japan

[73] Assignee: Victor Company of Japan, Ltd., Yokohama, Japan

[21] Appl. No.: 683,722

[22] Filed: Apr. 11, 1991

Related U.S. Application Data

[62] Division of Ser. No. 7,506,834, Apr. 10, 1990, Pat. No. 5,025,317.

Foreign Application Priority Data

Apr. 13, 1989 [JP] Japan .................................. 1-94227
Apr. 27, 1989 [JP] Japan .................................. 1-49948[U]

[51] Int. Cl.⁵ .................................................. H04N 9/21
[52] U.S. Cl. ..................................... 358/167; 358/905
[58] Field of Search ................ 358/36, 167, 187, 905, 358/166

[56] References Cited

U.S. PATENT DOCUMENTS

| | | | |
|---|---|---|---|
| 4,389,623 | 6/1983 | Onishi et al. | 358/905 X |
| 4,575,857 | 3/1986 | Murakami | 358/166 X |
| 4,897,725 | 1/1990 | Tanaka et al. | 358/167 |
| 4,912,557 | 3/1990 | Faroudja | 358/167 |
| 4,947,252 | 8/1990 | Kobayashi | 358/167 |

FOREIGN PATENT DOCUMENTS 61-152173 7/1986 Japan .

*Primary Examiner*—James J. Groody
*Assistant Examiner*—Mark R. Powell
*Attorney, Agent, or Firm*—Pollock, VandeSande & Priddy

[57] ABSTRACT

A transversal filter filters an input video signal with a filtering characteristic determined by tap gains. A row of error signals are generated on the basis of a difference between a ghost cancel reference signal in the input video signal and a predetermined reference signal. A magnification setting circuit sets a first magnification in accordance with the row of the error signals. A weight setting circuit converts an output signal from the magnification setting circuit into weighting data and feeding the weighting data into the transversal filter as the tap gains. The weight setting circuit functions to correct the first magnification into a second magnification in accordance with row numbers denoting the respective error signals in the row.

2 Claims, 4 Drawing Sheets

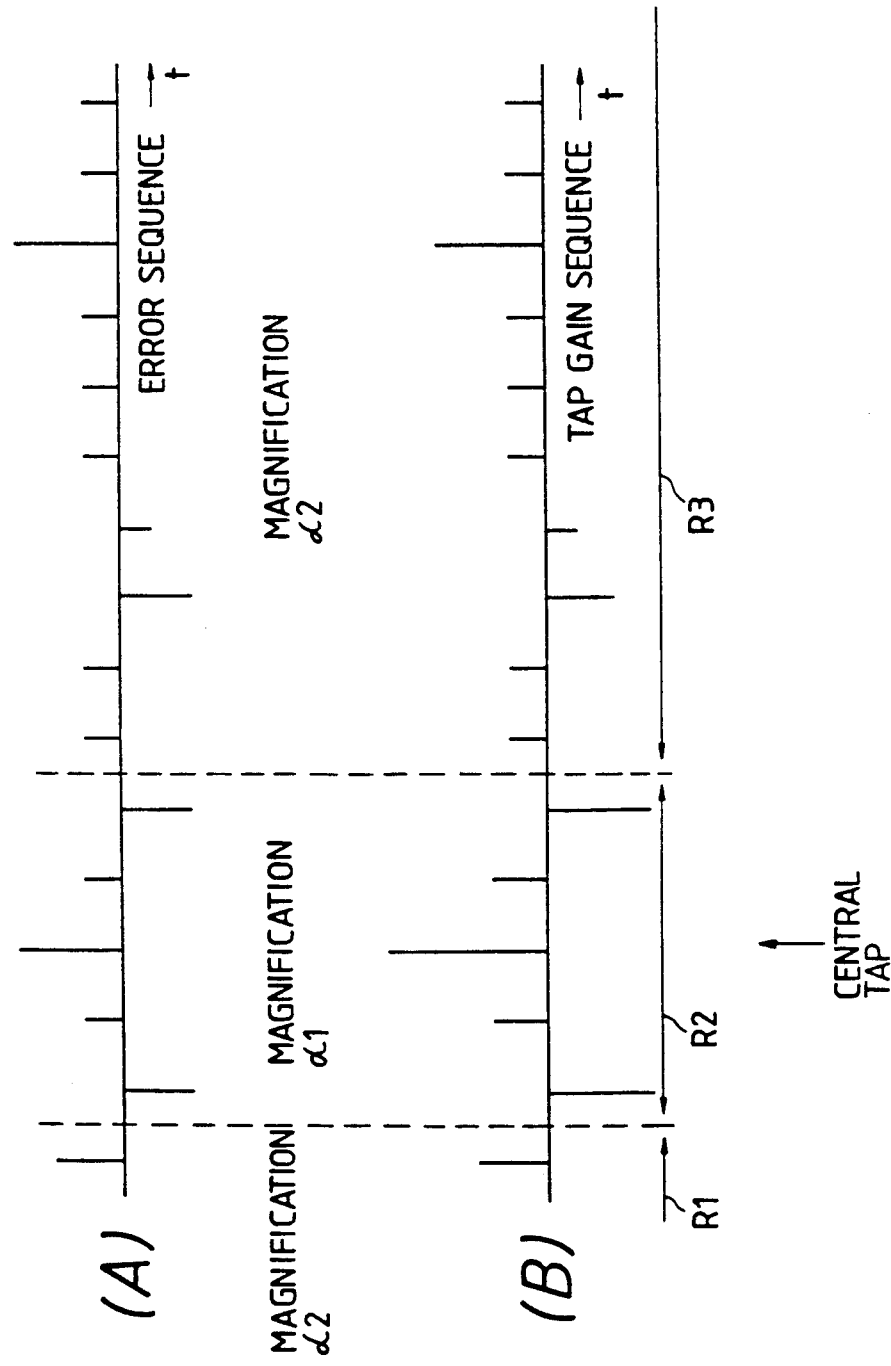

GHOST CANCELLER EMPLOYING PLURAL REFERENCE SIGNALS

This is a division of Ser. No. 07/506,834 filed on Apr. 10, 1990 now U.S. Pat. No. 5,025,317.

BACKGROUND OF THE INVENTION

This invention relates to a ghost canceller which can be used in various television and video systems.

It is know to use a transversal digital filter in a ghost canceller. Conventional ghost cancellers using transversal digital filters tend to be slow in response speed of ghost cancelling operation. The slow response speed results from the fact that a common magnification is given to the filter for calculating all of tap gains of the transversal digital filter.

SUMMARY OF THE INVENTION

It is an object of this invention to provide an excellent ghost canceller.

According to a first aspect of this invention, a ghost canceller comprises a transversal filter filtering an input video signal with a filtering characteristic determined by tap gains; a waveform extracting circuit extracting a waveform of a first ghost cancel reference signal contained in the input video signal; a reference signal generator generating a second ghost cancel reference signal synchronous with the first reference signal; a subtracter deriving a difference between the waveform of the first reference signal and a waveform of the second reference signal and generating a row of error signals representing the derived difference; a magnification setting circuit setting a first magnification in accordance with the row of the error signals; a weight setting circuit converting an output signal from the magnification setting circuit into weighting data and feeding the weighting data into the transversal filter as the tap gains; wherein the weight setting circuit comprises a first memory storing the row of the error signals which are identified by respective row numbers; means for sequentially feeding address signals of the respective row numbers to the first memory and sequentially reading out the row of the error signals from the first memory; a magnification correcting table responsive to the address signals for correcting the first magnification into a second magnification which varies as a function of the row numbers; a multiplier multiplying the row of the error signals read out from the first memory by the second magnification; a second memory storing a row of first tap gain signals; means for sequentially feeding the address signals of the respective row numbers to the second memory and sequentially reading out the row of the first tap gain signals from the second memory; an adder adding a row of outputs signals from the multiplier and the row of the first tap gain signals read out from the second memory for the respective row numbers to generate a row of second tap gain signals; and means for replacing the first tap gain signals by the second tap gain signals in the second memory; and means for feeding the second tap gain signals to the transversal filter as the tap gains.

According to a second aspect of this invention, a ghost canceller comprises a transversal filter having taps and filtering an input video signal with a filtering characteristic determined by tap gains of the respective taps, wherein the taps are separated into at least two groups in dependence upon positions of the taps; means for extracting a ghost cancel reference signal from the input video signal; means for generating a predetermined reference signal; means for deriving a difference between the extracted ghost cancel reference signal and the predetermined reference signal and generating an error signal representing the derived difference; means responsive to the error signal for determining first and second magnifications in accordance with the error signal, the first and second magnifications being different from each other; means for calculating the tap gains of the taps in a first of the two groups on the basis of the error signal and the first magnification; and means for calculating the tap gains of the taps in a second of the two groups on the basis of the error signal and the second magnification.

According to a third aspect of this invention, a ghost canceller comprises a transversal filter filtering an input video signal with a filtering characteristic determined by tap gains; a waveform extracting circuit extracting a waveform of a first ghost cancel reference signal contained in the input video signal; a reference signal generator generating a second ghost cancel reference signal synchronous with the first reference signal; a subtracter deriving a difference between the waveform of the first reference signal and a waveform of the second reference signal and generating a row of error signals representing the derived difference; a criterion function setting circuit calculating a criterion function on the basis of the row of the error signals; a memory storing a minimal value; a comparator determining whether or not the criterion function currently calculated by the criterion function setting circuit is smaller than the minimal value stored in the minimal value; means responsive to an output signal from the comparator for replacing the minimal value with the currently-calculated criterion function as a new minimal value when the currently-calculated criterion function is smaller than the minimal value, and for keeping the minimal value stored in the memory when the currently-calculated criterion function is not smaller than the minimal value; a magnification setting circuit determining a magnification on the basis of the row of the error signals and the output signal from the comparator; a weight setting means for calculating the tap gains on the basis of the magnification determined by the magnification setting circuit and the row of the error signals; means for counting a number of times of execution of the extracting of the waveform by the waveform extracting circuit; and means resetting the minimal value in the memory to a predetermined initial value when the number of times which is counted by the counting means reaches a predetermined number.

BRIEF DESCRIPTION OF THE DRAWINGS

FIG. 4 is a time chart showing a sequence of error signals and a sequence of tap gains in the ghost canceller of FIG. 1.

DESCRIPTION OF THE FIRST PREFERRED EMBODIMENT

Figure 1:
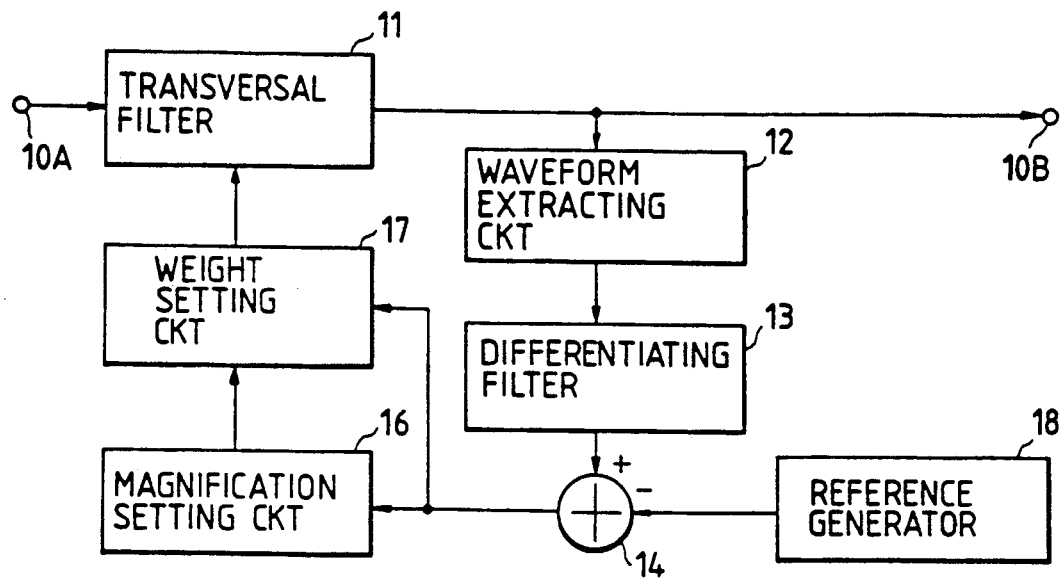
FIG. 1 is a block diagram of a ghost canceller according to a first embodiment of this invention.

With reference to FIG. 1, a ghost canceller has a transversal digital filter 11. A digitized video signal is inputted into the transversal filter 11 via an input terminal 10A. The transversal filter 11 processes the input video signal with a filtering characteristic to remove ghost components from the video signal. The filtering characteristic is determined by weights which will be explained later. The weights are also referred to as tap gains. The processed digital video signal is fed from the transversal filter 11 to an output terminal 10B.

The transversal filter 11 includes a suitable combination of an FIR filter and an IIR filter. Specifically, the transversal filter 11 has a cascade combination of delay circuits, weighting circuits multiplying signals from respective taps of the delay-circuit cascade combination by respective weights (tap gains), and an adder summing output signals from the weighting circuits and outputting the resultant sum as a filter output signal. The weights or tap gains which determine the filtering characteristic of the transversal filter 11 are fed from a weight setting circuit 17.

A waveform extracting circuit 12 receives the output signal from the transversal filter 11. The waveform extracting circuit 12 extracts a waveform of the output signal from the transversal filter 11 which occurs during a predetermined period where a reference signal for ghost cancellation is present but display information components are absent. For example, this predetermined period is one horizontal scanning period in a vertical blanking period. A differentiating filter 13 differentiates an output signal from the waveform extracting circuit 12. The differentiating filter 13 serves to prevent an adverse influence of a variation in a dc level in the case where the reference signal takes a step shape.

A reference waveform generator 18 determines an original reference waveform in advance and outputs a signal representing the original reference waveform. For example, the original reference waveform agrees with a differential of a bar waveform of GCR signal. The GCR signal is transmitted from a TV broadcasting station as a part of a color television signal, and the details of the GCR signal are described in Japanese Magazine "Nikkei Electronics", 1989 8.7 (No. 479), page 121.

A subtracter 14 calculates the difference between the output signals from the differentiating filter 13 and the reference waveform generator 18 and outputs an error signal representing the difference between the output signals from the differentiating filter 13 and the reference waveform generator 18. The subtracter 14 sequentially outputs error signals for respective time segments. A sequence of error signals which corresponds to one horizontal line is a unit of processing the error signals. A magnification setting circuit 16 sets a primary magnification in accordance with the error signal sequence fed from the subtracter 14.

The weight setting circuit 17 receives the error signal sequence from the subtracter 14. The weight setting circuit 17 also receives an output signal from the magnification setting circuit 16 which represents the primary magnification. The weight setting circuit 17 determines tap gains in accordance with the error signal sequence and the primary magnification and outputs a signal representative of the determined tap gains to the transversal filter 11.

Figure 2:
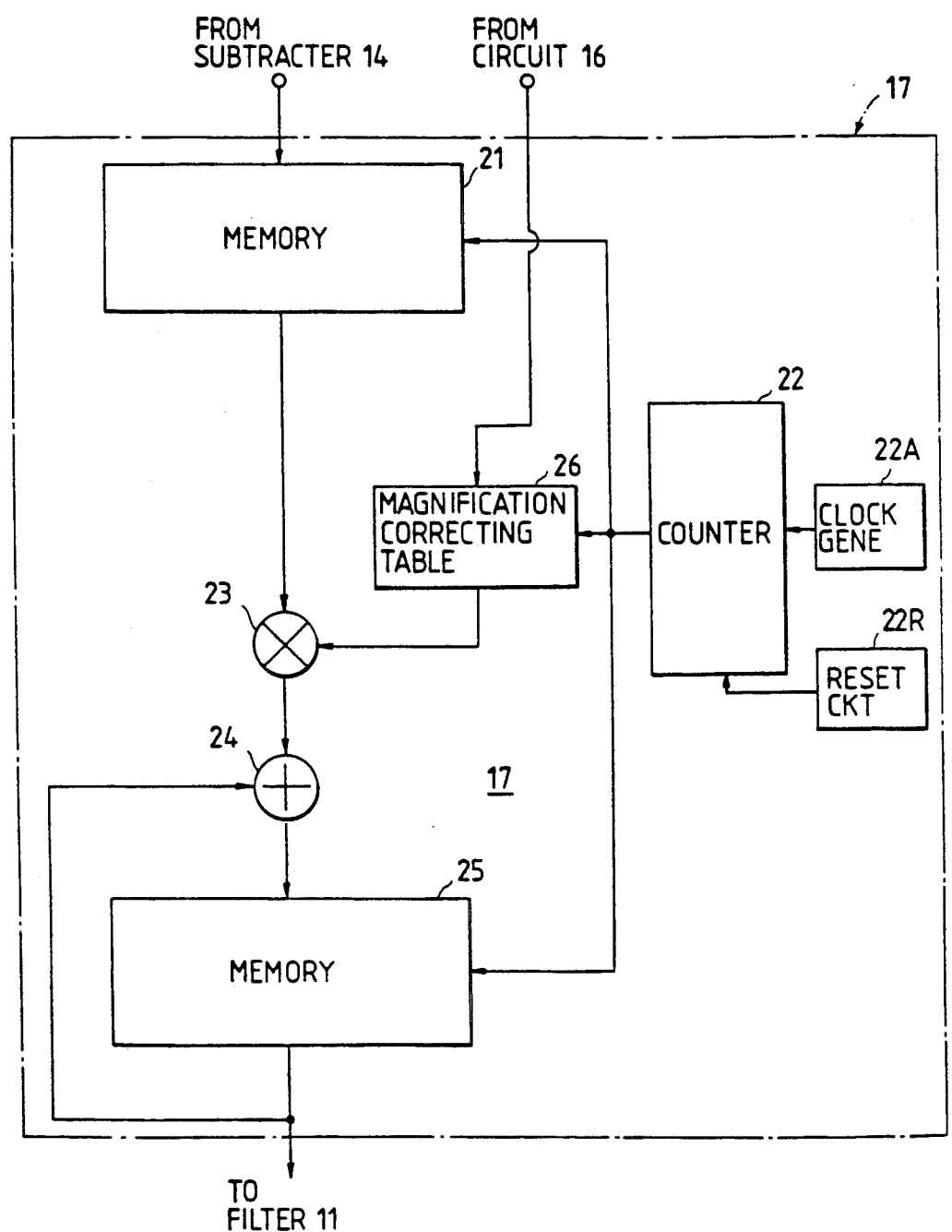
FIG. 2 is a block diagram of the weight setting circuit of FIG. 1.

As shown in FIG. 2, the weight setting circuit 17 includes a memory 21 loaded with the error signal sequence from the subtracter 14. The weight setting circuit 17 also includes a counter 22 counting pulses of a clock signal from a clock generator 22A and generating an address signal in response to the clock signal. The counter 22 is reset by an output signal from a reset circuit 22R. The address signal is periodically updated to sequentially represent row numbers corresponding to respective time segments in a horizontal line. The address signal is outputted from the counter 22 to the memory 21. The error signals are sequentially read out from the memory 21 in response to the address signal and are fed to a multiplier 23.

The clock generator 22A generates the clock signal on the basis of the color burst components of the video signal in a known way using a PLL circuit. For example, the clock signal has a frequency equal to four times the color subcarrier frequency.

Figure 3:
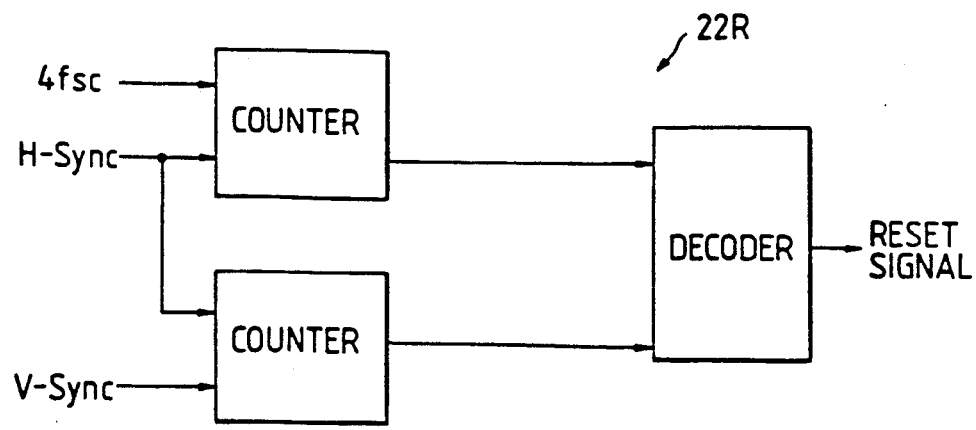
FIG. 3 is a block diagram of the reset circuit of FIG. 2.

As shown in FIG. 3, the reset circuit 22R includes counters 22B and 22C and a decoder 22D. The counter 22B counts pulses of the clock signal having a frequency equal to four times the color subcarrier frequency. The counter 22B is reset by each pulse of the horizontal sync signal of the video signal. The counter 22C counts pulses of the horizontal sync signal. The counter 22C is reset by each pulse of the vertical sync signal of the video signal. The decoder 22D generates a reset signal on the basis of the output signals from the counters 22B and 22C. The reset signal is fed to the counter 22.

The weight setting circuit 17 includes a magnification correcting table 26 receiving the output signal from the magnification setting circuit 16 which represents the primary magnification. For example, the magnification correcting table 26 is composed of a ROM. The magnification correcting table 26 also receives the address signal from the counter 22. The magnification correcting table 26 corrects the primary magnification into a final magnification in accordance with the address signal. The magnification correcting table 26 outputs a signal representative of the final magnification to the multiplier 23. The multiplier 23 multiplies the error signal by the final magnification and outputs the resultant to an adder 24. As will be made clear later, the resultant of this multiplication determines a component of a tap gain.

The weight setting circuit 17 includes a memory 25 storing a sequence of signals of tap gains of respective time segments in one horizontal line. The memory 25 receives the address signal from the counter 22. The signals of the tap gains are sequentially read out from the memory 25 in response to the address signal and are fed to the adder 24. The adder 24 adds the resultant of the multiplication and the tap gain of a common time segment, and thereby generates a new tap gain of the time segment and writes a signal of the new tap gain into the storage location of the memory 25 which corresponds to the time segment. In this way, the tap gains stored in the memory 25 are periodically updated with new tap gains which agree with the additions of the previous tap gains and the multiplications between the error signals and the final magnifications for the respective time segments. The signals of the tap gains which are read out from the memory 25 are also fed to the transversal filter 11.

The magnification correcting table 26 stores predetermined data of the final magnification which are designed so that the final magnification varies as a function of the position of a time segment relative to a horizontal line. The part (A) of FIG. 4 shows an example of the error signals outputted from the subtracter 14. In the part (A) of FIG. 4, the error signals are denoted by vertical lines whose lengths and directions show the values and polarities of the error signals respectively. The part (B) of FIG. 4 shows tap gains which are determined in the case where the error signals have the values and polarities as shown in the part (A) of FIG. 4. In the part (B) of FIG. 4, the tap gains are denoted by vertical lines whose lengths and directions show the values and polarities of the tap gains respectively. In FIG. 4, the interval R2 defined between the vertical broken lines indicates a time region conrresponding to the central and neighboring taps of the transversal filter 11. The final magnification is set to a predetermined value $\alpha 1$ for the interval R2. The final magnification is set to a predetermined value $\alpha 2$ for intervals R1 and R3 which precedes and follows the interval R1. The value $\alpha 1$ is chosen so as to enable a stable convergence of the tap gains. In addition, the value $\alpha 1$ is greater than the value $\alpha 2$ but is smaller than about three times the value $\alpha 2$.

The interval R2 closely relates to a function of equalizing waveform distortions caused by near ghosts. The updating of the tap gains of the interval R2 results in a variation in the input video signal components corresponding to the other intervals R1 and R3. Accordingly, in a prior art ghost canceler, the updating of the tap gains of the interval R2 requires a change of the tap gains of the other intervals R1 and R3 during a next updating process. In this invention, since the final magnification $\alpha 1$ for the interval R2 is greater than the final magnification $\alpha 2$ for the intervals R1 and R3 and thus the tap gains of the interval R2 are quickly converged, it is generally unnecessary to change the tap gains of the intervals R1 and R3 in response to the updating of the tap gains of the interval R2. Thus, in comparison with the prior art, this invention requires a smaller total number of calculation steps of the updating of the tap gains which are executed until the convergence is reached. Therefore, this invention enables a high response speed of ghost canceling operation.

DESCRIPTION OF THE SECOND PREFERRED EMBODIMENT

Figure 5:
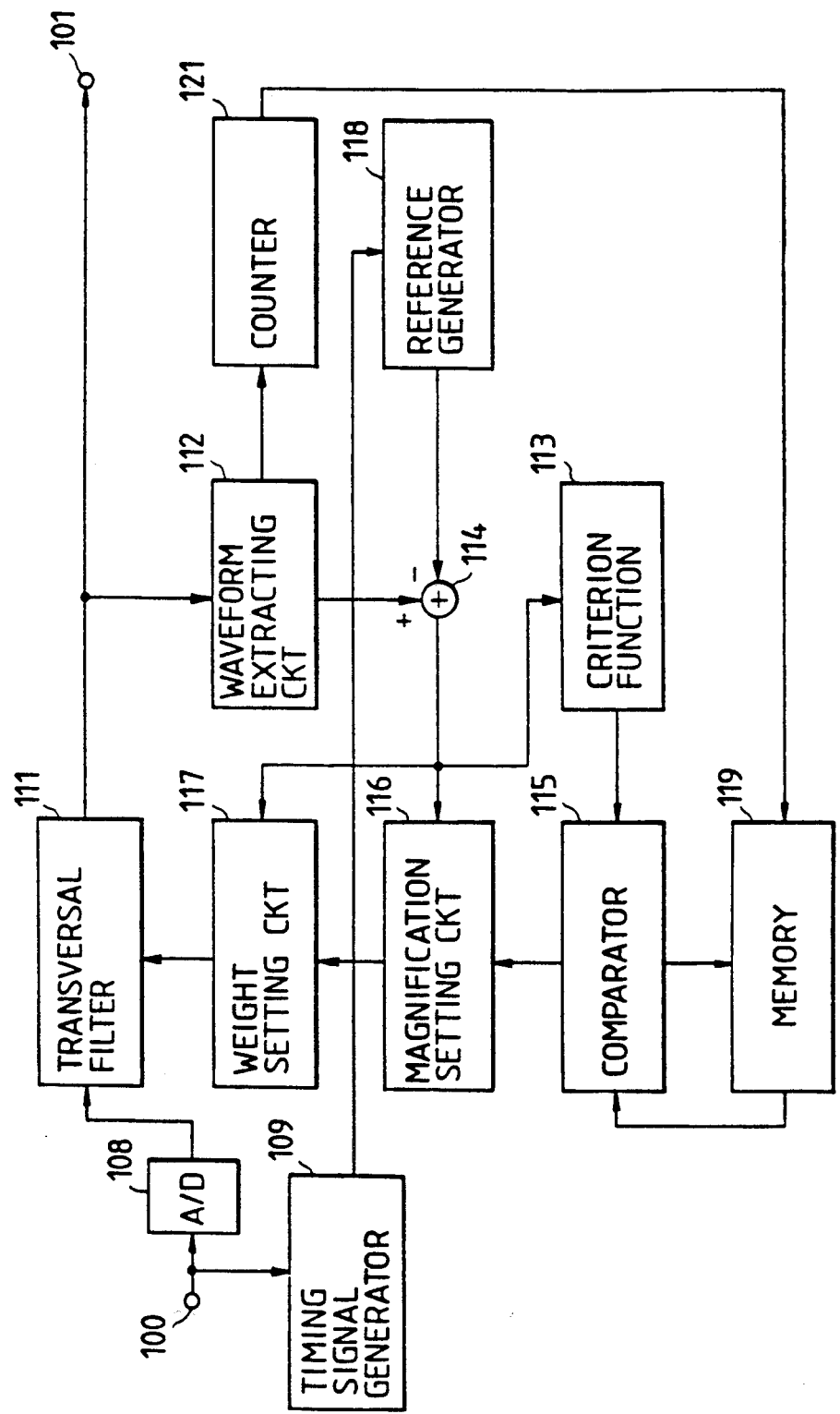
FIG. 5 is a block diagram of a ghost canceller according to a second embodiment of this invention.

With reference to FIG. 5, an analog video signal is fed to an analog-to-digital (A/D) converter 108 and a timing signal generator 109 via an input terminal 100. The A/D converter 108 converts the analog video signal into a corresponding digital video signal.

The digital video signal is fed from the A/D converter 108 to a transversal digital filter 111. The transversal filter 111 processes the video signal with a filtering characteristic to remove ghost components from the video signal. The filtering characteristic is determined by weights which will be explained later. The weights are also referred to as tap gains. The processed digital video signal is fed from the transversal filter 111 to an output terminal 101.

The transversal filter 111 includes a suitable combination of an FIR filter and an IIR filter. Specifically, the transversal filter 111 has a cascade combination of delay circuits, weighting circuits multiplying signals from respective taps of the delay-circuit cascade combination by respective weights (tap gains), and an adder summing output signals from the weighting circuits and outputting the resultant sum as a filter output signal. The weights or tap gains which determine the filtering characteristic of the transversal filter 111 are fed from a weight setting circuit 117.

A waveform extracting circuit 112 receives the output signal from the transversal filter 111. The waveform extracting circuit 112 extracts a waveform of the output signal of the transversal filter 111 which occurs during a predetermined period where a reference signal for ghost cancellation is present but display information components are absent. For example, this predetermined period is one horizontal scanning period in a vertical blanking period. The extraction of the waveform is periodically executed in response to each reference signal extracting pulse fed from the timing signal generator 109. The waveform extracting circuit 112 transmits the reference signal extracting pulse to a counter 121. Thus, the waveform extracting circuit 112 outputs a pulse to the counter 121 for each waveform extracting process. The waveform extracting circuit 112 includes a differentiating filter which differentiates the extracted waveform. The differentiating filter serves to prevent an adverse influence of a variation in a dc level in the case where the reference signal takes a step shape. The waveform extracting circuit 112 outputs a signal representing the differentiated waveform.

A reference waveform generator 118 determines an original reference waveform in advance and outputs a signal representing the original reference waveform. For example, the original reference waveform agrees with a differential of a bar waveform of a GCR signal. The GCR signal is transmitted from a TV broadcasting station as a part of a color television signal, and the details of the GCR signal are described in Japanese Magazine "Nikkei Electronics", 1989 8.7 (No 479), page 121.

The timing signal generator 109 generates a timing signal on the basis of the horizontal sync signal, the vertical sync signal, or another sync signal in the analog video signal. The timing signal generator 109 feeds the timing signal to the reference waveform generator 118. The reference waveform generator 118 outputs the signal of the original reference waveform at a timing determined by the timing signal.

A subtracter 114 calculates the difference between the output signals from the waveform extracting circuit 112 and the reference waveform generator 118 and outputs an error signal representing the difference between the output signals from the waveform extracting circuit 112 and the reference waveform generator 118. The signal outputted from the reference waveform generator 118 to the subtracter 114 is synchronized with the output signal from the waveform extracting circuit 112 to the subtracter 114 by the operation of the timing signal fed to the reference waveform generator 118.

A criterion function setting circuit 113 receives the error signal from the subtracter 114. The criterion function setting circuit 113 determines a criterion function on the basis of the error signal. For example, one or both of the definite integral of the absolute value of the error signal over an arbitrary time interval and the definite integral of the square of the error signal over an arbitrary time interval are used as the criterion function. The criterion function setting circuit 113 is shown, for example, as a criterion function setting circuit in U.S. patent application Ser. No. 426,602 filed on Oct. 25, 1989, the disclosure of which is hereby incorporated by reference.

The criterion function currently determined by the criterion function setting circuit 113 is compared by a comparator 115 with a minimal value of the criterion function which is read out from a memory 119. When the criterion function currently determined by the criterion function setting circuit 113 is equal to or greater than the minimal value read out from the memory 119, the minimal value remains stored in the memory 119. When the criterion function currently determined by the criterion function setting circuit 113 is smaller than the minimal value read out from the memory 119, the currently-determined criterion function is stored into the memory 119 as a new minimal value replacing the previous minimal value.

A magnification setting circuit 116 receives the error signal from the subtracter 114. The magnification setting circuit 116 also receives an output signal from the comparator 115 which represents the result of the comparison. The magnification setting circuit 116 basically sets a magnification in accordance with the error signal. When the magnification setting circuit 116 is informed by the output signal from the comparator 115 that the result of the comparison is unacceptable, the magnification setting circuit 116 forces the magnification to be 0 independent of the error signal.

The weight setting circuit 117 receives the error signal from the subtracter 114. The weight setting circuit 117 receives an output signal from the magnification setting circuit 16 which represents the magnification. The weight setting circuit 117 determines tap gains in accordance with the error signal and the magnification and outputs a signal representative of the determined tap gains to the transversal filter 111. The weight setting circuit 117 may be similar to the weight setting circuit 17 of FIG. 2 or one of known weight setting circuits.

As described previously, the waveform extracting circuit 112 outputs a pulse to the counter 121 for each waveform extracting process. The counter 121 counts output pulses from the waveform extracting circuit 112 and calculates the number of times of the execution of the waveform extracting process. When the calculated number of times of the execution of the waveform extracting process reaches a predetermined number, the counter 121 resets the minimal value in the memory 119 to a predetermined initial value. In this way, the minimal value in the memory 119 is periodically reset to the predetermined initial value. The periodical resetting of the minimal value in the memory 119 prevents the tap gains from converging on and then remaining in wrong points, and enables the ghost canceller to keep pace with changes in the ghosting characteristics.

What is claimed is:

1. A ghost canceller comprising:
a transversal filter filtering an input video signal with a filtering characteristic determined by tap gains;
a waveform extracting circuit extracting a waveform of a first ghost cancel reference signal contained in the input video signal;
a reference signal generator generating a second ghost cancel reference signal synchronous with the first reference signal;
a subtracter deriving a difference between the waveform of the first reference signal and a waveform of the second reference signal and generating a row of error signals representing the derived difference;
a magnification setting circuit setting a first magnification in accordance with the row of the error signals;
a weight setting circuit converting an output signal from the magnification setting circuit into weighting data and feeding the weighting data into the transversal filter as the tap gains;
wherein the weight setting circuit comprises a first memory storing the row of the error signals which are identified by respective row numbers; means for sequentially feeding address signals of the respective row numbers to the first memory and sequentially reading out the row of the error signals from the first memory; a magnification correcting table responsive to the address signals for correcting the first magnification into a second magnification which varies as a function of the row numbers; a multiplier multiplying the row of the error signals read out from the first memory by the second magnification; a second memory storing a row of first tap gain signals; means for sequentially feeding the address signals of the respective row numbers to the second memory and sequentially reading out the row of the first tap gain signals from the second memory; an adder adding a row of outputs signals from the multiplier and the row of the first tap gain signals read out from the second memory for the respective row numbers to generate a row of second tap gain signals; and means for replacing the first tap gain signals by the second tap gain signals in the second memory; and means for feeding the second tap gain signals to the transversal filter as the tap gains.

2. A ghost canceller comprising:
a transversal filter having taps and filtering an input video signal with a filtering characteristic determined by tap gains of the respective taps, wherein the taps are separated into at least two groups in dependence upon positions of the taps;
means for extracting a ghost cancel reference signal from the input video signal;
means for generating a predetermined reference signal;
means for deriving a difference between the extracted ghost cancel reference signal and the predetermined reference signal and generating an error signal representing the derived difference;
means responsive to the error signal for determining first and second magnifications in accordance with the error signal, the first and second magnifications being different from each other;
means for calculating the tap gains of the taps in a first of the two groups on the basis of the error signal and the first magnification; and
means for calculating the tap gains of the taps in a second of the two groups on the basis of the error signal and the second magnification.

* * * * *